US008378047B2

(12) United States Patent
Stadlbauer et al.

(10) Patent No.: US 8,378,047 B2
(45) Date of Patent: Feb. 19, 2013

(54) BIAXIALLY ORIENTED POLYPROPYLENE FILM

(75) Inventors: Manfred Stadlbauer, Linz (AT); Eberhard Ernst, Unterweilersdorf (AT); Petri Lehmus, Helsinki (FI); Yvo Daniels, Zonhofen (BE); Franck Jacobs, Evergem (BE)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 12/351,223

(22) Filed: Jan. 9, 2009

(65) Prior Publication Data

US 2009/0149612 A1 Jun. 11, 2009

Related U.S. Application Data

(63) Continuation of application No. PCT/EP2007/006059, filed on Jul. 9, 2007.

(30) Foreign Application Priority Data

Jul. 10, 2006 (EP) ..................................... 06014272

(51) Int. Cl.
*C08F 110/06* (2006.01)
*C08F 210/00* (2006.01)

(52) U.S. Cl. ....................................... 526/348; 526/351
(58) Field of Classification Search .................. 526/348, 526/351
See application file for complete search history.

(56) References Cited

U.S. PATENT DOCUMENTS

| 4,304,890 | A | 12/1981 | Suzuki et al. |
| 4,404,342 | A | 9/1983 | Miyoshi et al. |
| 4,483,971 | A | 11/1984 | Sato et al. |
| 4,634,745 | A | 1/1987 | Ehrig et al. |
| 4,701,432 | A | 10/1987 | Welborn, Jr. |
| 4,808,561 | A | 2/1989 | Welborn, Jr. |
| 5,250,631 | A | 10/1993 | McCullough, Jr. |
| 5,326,625 | A | 7/1994 | Schuhmann et al. |
| 5,948,547 | A | 9/1999 | Milkielski et al. |
| 6,086,982 | A | 7/2000 | Peiffer et al. |
| 6,225,432 | B1 | 5/2001 | Weng et al. |
| 6,805,930 | B2 | 10/2004 | Hanada et al. |
| 7,235,618 | B2 * | 6/2007 | Lin et al. .................... 526/348.1 |
| 2002/0173602 | A1 | 11/2002 | Appleyard |
| 2002/0198318 | A1 | 12/2002 | Obata et al. |
| 2004/0010087 | A1 | 1/2004 | Obata et al. |
| 2004/0072005 | A1 | 4/2004 | German et al. |
| 2005/0090571 | A1 | 4/2005 | Mehta |

FOREIGN PATENT DOCUMENTS

| DE | 2827764 | 1/1980 |
| DE | 203 915 | 11/1983 |
| DE | 3 539 352 | 5/1986 |
| DE | 198 27 327 | 12/1999 |
| DE | 199 49 235 | 5/2000 |
| EP | 0 36 457 | 9/1981 |
| EP | 0 190 889 | 8/1986 |
| EP | 0 384 431 | 8/1990 |
| EP | 395204 | 10/1990 |
| EP | 0 887 379 | 12/1990 |
| EP | 0 674 325 | 9/1995 |
| EP | 0 674 991 | 10/1995 |
| EP | 0 690 458 | 1/1996 |
| EP | 0 747 212 | 11/1996 |
| EP | 0 745 637 | 12/1996 |
| EP | 0 873 862 | 10/1998 |
| EP | 0 879 830 | 11/1998 |
| EP | 0 885 918 | 12/1998 |
| EP | 0 893 802 | 1/1999 |
| EP | 0 919 572 | 6/1999 |
| EP | 0 942 013 | 9/1999 |
| EP | 1 295 910 | 3/2003 |
| EP | 1 302 310 | 4/2003 |
| EP | 1 367 068 | 12/2003 |
| EP | 1 408 077 | 4/2004 |
| EP | 1 429 346 | 6/2004 |
| EP | 1 484 345 | 12/2004 |
| EP | 1 495 861 | 1/2005 |
| EP | 1595802 | 11/2005 |
| EP | 1 634 699 | 3/2006 |
| EP | 1 724 289 | 11/2006 |
| EP | 1 726 602 | 11/2006 |
| EP | 1 726 603 | 11/2006 |
| EP | 1 847 551 | 10/2007 |
| EP | 1 847 552 | 10/2007 |
| EP | 1 847 555 | 10/2007 |
| EP | 1882703 | 1/2008 |
| JP | 2001/0168431 | 6/1999 |

(Continued)

OTHER PUBLICATIONS

Chujo, R. Heptad configurational analysis of 13C N.M.R. spectra in highly isotactic polypropylene, *Polymer 29*, vol. 29, January, pp. 138-143 (1988).

Chujo R. Two-site model analysis of 13C n.m.r, of polypropylene polymerized by Ziegler-Natta catalyst with externally alkoxysilane donors, *Polymer*, vol. 35, part II, pp. 339-342 (1994).

Sentmanat, Rheol, *Measuring the Transient Extension Rheology of Polythylene Melts Using the SER Universal Testing Platform*, J. Rheology, May/June Issue, pp. 1-20 (2005).

(Continued)

*Primary Examiner* — Rebecca Anderson
*Assistant Examiner* — Sonya Wright
(74) *Attorney, Agent, or Firm* — McAndrews, Held & Malloy, Ltd.

(57) ABSTRACT

The present technology relates to a biaxially oriented polypropylene film. The biaxially oriented polypropylene film comprises a polypropylene material having xylene solubles of at least 0.5 percent by weight. The polypropylene also has a strain hardening index of at least 0.15 measured at a deformation rate $d\epsilon/dt$ of $1.00\ s^{-1}$ at a temperature of 180° C. In certain embodiments, the strain hardening index is defined as the slope of a logarithm to the basis 10 of a tensile stress growth function as a function of a logarithm to the basis 10 of a Hencky strain for the range of Hencky strains between 1 and 3.

13 Claims, 3 Drawing Sheets

FOREIGN PATENT DOCUMENTS

| | | |
|---|---|---|
| JP | 2001/354 814 | 7/2000 |
| JP | 2003 147110 | 11/2001 |
| JP | 2002 363356 | 12/2002 |
| JP | 2006/022 276 | 6/2004 |
| WO | WO 94/28034 | 12/1994 |
| WO | WO 95/30708 | 11/1995 |
| WO | WO 97/22633 | 6/1997 |
| WO | WO 92/12182 | 7/1997 |
| WO | WO 98/10016 | 3/1998 |
| WO | WO 98/58971 | 12/1998 |
| WO | WO 99/09096 | 2/1999 |
| WO | WO 99/24478 | 5/1999 |
| WO | WO 99/29742 | 6/1999 |
| WO | WO 00/12572 | 3/2000 |
| WO | WO0063287 | 10/2000 |
| WO | WO 00/68315 | 11/2000 |
| WO | WO 00/73369 | 12/2000 |
| WO | WO 00/78858 | 12/2000 |
| WO | WO 01/25296 | 4/2001 |
| WO | WO 01/48034 | 7/2001 |
| WO | WO 01/98409 | 12/2001 |
| WO | WO 02/16455 | 2/2002 |
| WO | WO 02/44251 | 6/2002 |
| WO | WO 02/090400 | 11/2002 |
| WO | WO03/000754 | 1/2003 |
| WO | WO 03/040233 | 5/2003 |
| WO | WO 03/051934 | 6/2003 |
| WO | WO 2004/013193 | 2/2004 |
| WO | WO2004/026921 | 4/2004 |
| WO | WO 2004/037871 | 5/2004 |
| WO | WO 2004/046208 | 6/2004 |
| WO | WO 2004/052950 | 6/2004 |
| WO | WO2004101673 | 11/2004 |
| WO | WO2005030811 | 4/2005 |
| WO | WO 2005/044877 | 5/2005 |
| WO | WO2006065651 | 6/2006 |
| WO | WO 2006/118890 | 11/2006 |
| WO | WO 2008/022803 | 2/2008 |

OTHER PUBLICATIONS

Zimm, B.H. and Stockmayer, Walter The Dimension of Chain Molecules Containing Branches and Rings, *The Journal of Chemical Physics*, vol. 17, No. 12, pp. 1301-1314 (1949).

Hayashi, et al., 13C N.M.R. spectral assignments and hexad comonomer sequence determination in stereoregular ethylene-propylene copolymer, *Polymer*, vol. 29, pp. 1848-1847 (1988).

Polypropylene Process Review, Does Borstar shine?, *ECN Chemscope*, May 1999, pp. 17-18, 20-21.

Pinter, Gerald et al., *Accelerated quality assurance tests for PE pipe grades*, 64th Annual Technical Conference, pp. 2080-2084, Society of Plastics Engineers, (2006).

Cazenave, J., et al., Short-term mechanical and structural approaches for the evaluation of polyethylene stress crack resistance Groupe d'Etude de Metallurgie Physique et de Physique des Materiaux, *Polymer 47*, pp. 3904-3914 (2006).

Nezbedova, E et al., Influence of processing conditions on the structural and fracture behavior of PP pipe grades, *Journal of Macromolecular Science*, Part B Physics, B41 Nos. 4-6, pp. 711-723, (2002).

Nezbedova, E. et al., Brittle failure versus structure of HDPE pipe resins, *Journal of Macromolecular Science*, Part B Physics, B40 3&4, pp. 507-515, (2001).

Nezbedova, E. et al., Relation of slow crack growth failure time to structure of HDPE, *Mechanics of Time-Dependent Materials 5*, pp. 67-78, (2001).

Nezbedova, E., et al., The Relationship Between Fracture Behavior and Structural Parameters of HDPE, *Plastics Pipeline Systems for the Millenium*, pp. 349-357 (1998).

Lodefier, Ph., et al., Chemical Heterogeneity of Poly(ethylene terephthalate) As Revealed by Temperature Rising Elution Fractionation and Its Influence on Polymer Thermal Behavior: A Comparison with Poly(ethylene terephthalate-co-isophthalate) *Macromolecules*, vol. 32 No. 21, pp. 7135-7139 (1999).

Hanyu, Aiko et al., Properties and film applications of metallocene-based isotactic polypropylenes, *Journal of Plastic Film & Sheeting*, vol. 15 No. 5, pp. 109-119, (1999).

Gueugnaut, D., et al. Detection of divergences in polyethylene resins fabrication by means of the modified stepwise isothermal segregation technique, *Journal of Applied Polymer Science*, vol. 73 No. 11, pp. 2103-2112, (1999).

Scholten F.L., et al., GERG materials bank of PE gas pipe grades. Recent developments, *Proceedings of the International Gas Research Conference*, vol. 3, pp. 257-268, (1998).

Rätzsch, Radical reactions on polypropylene in the solid state, *Progress in Polymer Science*, Issue 27, pp. 1195-1282 (2002).

J. Dealy, "Structure and Rheology of Molten polymers", *Hanser Publishers* Munich, Germany, pp. 377-386, 2006.

Naguib E. Hani, Fundamental Foaming Mechanisms Governing the Volume Expansion of Extruded Polypropylene Foams, *Journal Applied. Poly. Science*, 91 pp. 2662-2668, (2008).

S. T. Lee, Foam Extrusion Principles and Practice, Technomic Publishing, pp. 1-15 (2000).

Virkkunen, Ville, et. al, Tacticity distribution of isotactic polypropylene prepared with heterogeneous Ziegler-Natta Catalyst. 2. Application and analysis of SSA data for polypropylene, *Polymer*, vol. 45, pp. 4623-4631, (2004).

Maria de Fátima Vieira Marques, et, al, Propylene Polymerization using combined Syndio- and isospecific metallocene catalysts supported on silica/MAO, *Journal of Applied Polymer Science*, vol. 99, pp. 628-637, (2006).

Spaleck, Walter, Synthesis and Properties of Metallocene Catalysts for Isotopic Polypropylene Production, *Metallocene-based Polyoefins*, pp. 400-424, (2000).

Product info sheet, Basell Polyolefins Company, "Pro-faxPF814", pp. 1 and 2.

The Dow Company, Commercial Product JQDB-2230NT of Dow, "Technical information for wire and cable" Telecom, pp. 1-2, Mar. 2005.

Product information sheet, Polypropylene Deploy TM WB3130HMS High-Melt Strength Polypropylene for Foam Extrusion.

Gahleitner, Markus et al., "Propylene-Ethylene Random Copolymers: Comonomer Effects on Crystallinity and Application Properties," Journal of Applied Polymer Science, 95(5), pp. 1073-1081, (2005).

Haager, Markus et al., "Estimation of Slow Crack Growth Behavior in Polyethylene After Stepwise Isothermal Crystallization," Macromolecular Symposia, 217, pp. 383-390, (2004).

Hanyu, Aiko, et al., "Properties and Film Applications of Metallocene-Based Isotactic Polypropylenes," Journal of Plastic Film and Sheeting, vol. 15, pp. 109-119, Apr. 1999.

Ishikawa, Narumi, "Study on the Physical Properties of Polyethylene for Gas," Nisseki Rebyu Nippon Sekiyu, 32-(4), pp. 153-158, 1990.

J. Krupka, et al., "Measurements of the Complex Permittivity of Microwave Circuit Board Substrates Using a Split Dielectric Resonator and Re-entrant Cavity Techniques," Proceedings of the Conference on Dielectric Materials, Measurements and Applications—DMMA '96, Bath, UK, published by the IEE, London, 1996.

J. Krupka, et al., "Split-Post Dielectric Resonator Technique for Precise Measurements of Laminar Dielectric Specimens—Measurement Uncertainties," Proceedings of the XIII Int. Conference Mikon 2000, Wroclaw, Poland, pp. 305-308, 2000.

J. Sheirs, W. Kaminski, "Metallocene-based Polyolefins," vol. 1, pp. 401-423, (1999).

Non-Final Office Action for U.S. Appl. No. 12/342,173 mailed Mar. 1, 2010.

Non-Final Office Action for U.S. Appl. No. 12/350,603 mailed Jun. 23, 2010.

Non-Final Office Action for U.S. Appl. No. 12/367,856 mailed Mar. 31, 2010.

Non-Final Office Action for U.S. Appl. No. 12/367,911 mailed Mar. 4, 2010.

Non-Final Office Action for U.S. Appl. No. 12/476,379 mailed Feb. 4, 2010.

\* cited by examiner

Determination of the SHI of "A" at a strain rate of 0.1s$^{-1}$ (SHI@0.1s$^{-1}$)

FIGURE 1

Deformation Rate versus Strain Hardening

FIGURE 2

Catalyst particle size distribution via Coulter counter

FIGURE 3

BIAXIALLY ORIENTED POLYPROPYLENE FILM

RELATED APPLICATIONS

This application is a continuation of International Application Serial No. PCT/EP2007/006059 (International Publication Number WO 2008/006532), having an International filing date of Jul. 9, 2007 entitled "Biaxially Oriented Polypropylene Film". International Application No. PCT/EP2007/006059 claimed priority benefits, in turn, from European Patent Application No. 06014272.6, filed Jul. 10, 2006. International Application No. PCT/EP2007/006059 and European Application No. 06014272.6 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates to a biaxially oriented polypropylene film.

Biaxially oriented polypropylene films, also known as oriented polypropylene films, are used in a wide range of technical applications such as packaging, tapes or capacitor films. Desired properties of these films are high stiffness and good thermal resistance. At the same time, the film should have beneficial processing properties. In particular, it is of interest to have a low drawing temperature while still obtaining films with high draw ratios and no film breaking or sagging. However, any improvement in processability should not be achieved at the expense of mechanical and/or thermal properties of the final film.

EP 0745637 A1 discloses a biaxially oriented polypropylene film having a high surface modulus and a n-heptane soluble fraction of less than 1 wt %. A single site metallocene catalyst is used for the preparation of the polymer.

WO 98/10016 discloses a biaxially oriented film made from a polypropylene which comprises a homopolymer fraction and a copolymer fraction. In the process for the preparation of the polypropylene, two different metallocene catalysts are used.

BRIEF SUMMARY OF THE INVENTION

Considering the problems outlined above, it is an object of the present technology to provide a biaxially oriented polypropylene film having an improved balance between mechanical and thermal properties and processing properties. In particular, the film should have high stiffness and high thermal resistance while still being obtainable with high draw ratios at a low stretching temperature with no film breaking and no sagging.

The present technology is based on the finding that an improved balance of mechanical and/or thermal properties and processing properties can be accomplished by introducing a specific degree of short-chain branching in combination with a specific amount of non-crystalline areas.

In a first embodiment of the present technology, the object outlined above is solved by providing a biaxially oriented polypropylene film which comprises a polypropylene having
a) xylene solubles (XS) of at least 0.5 wt.-% and
b) a strain hardening index (SHI@1 $s^{-1}$) of at least 0.15 measured at a deformation rate $d\epsilon/dt$ of 1.00 $s^{-1}$ at a temperature of 180° C., wherein the strain hardening index (SHI) is defined as the slope of the logarithm to the basis 10 of the tensile stress growth function ($\lg(\eta_E^+)$) as function of the logarithm to the basis 10 of the Hencky strain ($\lg(\epsilon)$) in the range of the Hencky strains between 1 and 3.

Surprisingly, it has been found that biaxially oriented films comprising a polypropylene with such characteristics have superior properties compared to the films known in the art. Especially, the inventive films are obtainable at high process stability and low process temperature. Moreover and surprisingly the inventive film has in addition good mechanical properties such as a high stiffness expressed in tensile modulus.

Certain embodiments of the presently described technology provide a biaxially oriented polypropylene film which comprises a polypropylene. The polypropylene can have xylene solubles of at least 0.5 percent by weight. The polypropylene also has a strain hardening index of at least 0.15 measured at a deformation rate $d\epsilon/dt$ of 1.00 $s^{-1}$ at a temperature of 180° C.

In certain embodiments, the strain hardening index is defined as the slope of a logarithm to the basis 10 of a tensile stress growth function as a function of a logarithm to the basis 10 of a Hencky strain for the range of Hencky strains between 1 and 3.

In certain embodiments, a biaxially oriented polypropylene film is provided having xylene solubles of less than 1.35 percent by weight, and a tensile modulus of at least 1800 MPa at a draw ratio of 4 in machine direction and a draw ratio of 4 in transverse direction, wherein the tensile modulus is measured according to ISO 527-3 at a cross head speed of 1 mm/min.

Certain embodiments provide a process for the preparation of the biaxially oriented polypropylene film described herein. The process comprising the steps of providing a polypropylene having xylene solubles of at least 0.5 percent by weight and a strain hardening index of at least 0.15 measured at a deformation rate $d\epsilon/dt$ of 1.00 $s^{-1}$ at a temperature of 180° C.; and stretching the polypropylene in a machine direction and a transverse direction to biaxially orient the film.

DETAILED DESCRIPTION OF THE INVENTION

A first requirement of the first embodiment of the present technology is that the biaxially oriented film comprises a polypropylene which has xylene solubles of some extent, i.e. of at least 0.50 wt.-% (percent by weight). Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication of the amount of non-crystalline areas.

Preferably, the polypropylene component of the film has xylene solubles of more than 0.60 wt.-%. On the other hand, the amount of xylene solubles should not be too high since they are detrimental for some applications such as food packing and represent a potential contamination risk. Accordingly it is preferred that the xylene solubles are not more than 1.50 wt.-%, still more preferably not more than 1.35 wt.-% and yet more preferably not more than 1.00 wt.-%. In preferred embodiments the xylene solubles are in the range of 0.50 to 1.50 wt.-%, yet more preferably in the range of 0.60 to 1.35 wt.-%, and still more preferably in the range of 0.60 to 1.00 wt.-%.

Preferably, the biaxially oriented polypropylene film has xylene solubles of less than 1.35 wt.-%. More preferably, the film has xylene solubles in the range of 0.5 wt.-% to less than 1.35 wt. %, even more preferably 0.60 wt.-% to less than 1.35 wt.-%, and most preferably 0.60 wt.-% to 1.00 wt.-%.

The polypropylene component of the film according to the present technology is characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as short-chain branching, and as such can be far more descriptive with regard to polymer characterization than other types of bulk rheological measurement which apply shear flow.

Accordingly one requirement of the present technology is that the capacitor film and/or the polypropylene component of the capacitor film has/have a strain hardening index (SHI@1 s$^{-1}$) of at least 0.15, more preferred of at least 0.20, yet more preferred the strain hardening index (SHI@1 s$^{-1}$) is in the range of 0.15 to 0.30, like 0.15 to below 0.30, and still yet more preferred in the range of 0.15 to 0.29. In a further embodiment it is preferred that the capacitor film and/or the polypropylene component of the capacitor film has/have a strain hardening index (SHI@1 s$^{-1}$) in the range of 0.20 to 0.30, like 0.20 to below 0.30, more preferred in the range of 0.20 to 0.29.

Figure 1:
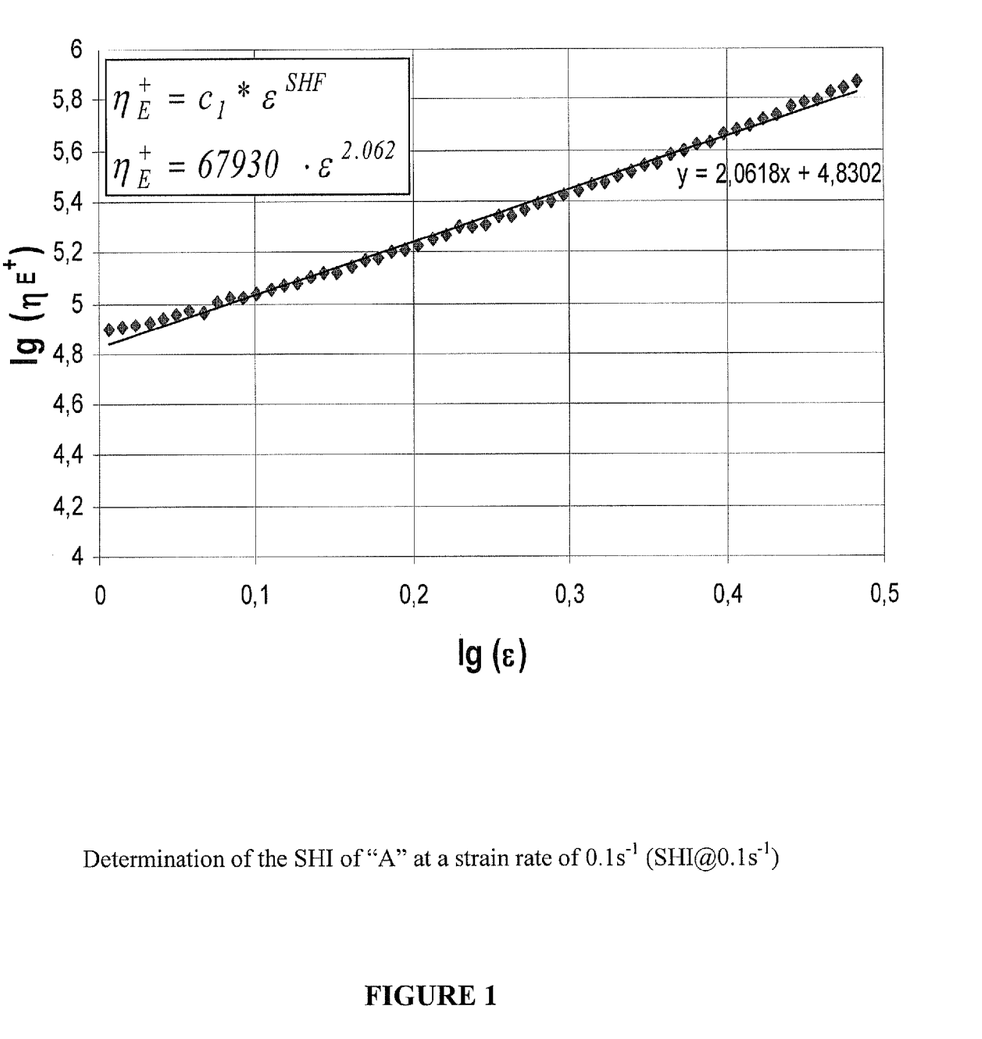
FIG. 1 is a graph depicting the determination of a Strain Hardening Index of "A" at a strain rate of 0.1 $s^{-1}$ (SHI@0.1 $s^{-1}$).

The strain hardening index is a measure for the strain hardening behavior of the polypropylene melt. Moreover values of the strain hardening index (SHI@1 s$^{-1}$) of more than 0.10 indicate a non-linear polymer, i.e. a short-chain branched polymer. In the present technology, the strain hardening index (SHI@1 s$^{-1}$) is measured by a deformation rate dε/dt of 1.00 s$^{-1}$ at a temperature of 180° C. for determining the strain hardening behavior, wherein the strain hardening index (SHI@1 s$^{-1}$) is defined as the slope of the tensile stress growth function $\eta_E^+$ as a function of the Hencky strain ε on a logarithmic scale between 1.00 and 3.00 (see FIG. 1). Thereby the Hencky strain ε is defined by the formula ε=$\dot{\epsilon}_H$·t, wherein the Hencky strain rate $\dot{\epsilon}_H$ is defined by the formula:

$$\dot{\epsilon}_H = \frac{2 \cdot \Omega \cdot R}{L_0};$$

with

"$L_0$" is the fixed, unsupported length of the specimen sample being stretched which is equal to the centerline distance between the master and slave drums;

"R" is the radius of the equi-dimensional windup drums; and

"Ω" is a constant drive shaft rotation rate.

In turn the tensile stress growth function $\eta_E^+$ is defined by the formula:

$$\eta_E^+(\epsilon) = \frac{F(\epsilon)}{\dot{\epsilon}_H \cdot A(\epsilon)}; \quad \text{with}$$

$$T(\epsilon) = 2 \cdot R \cdot F(\epsilon); \quad \text{and}$$

$$A(\epsilon) = A_0 \cdot \left(\frac{d_S}{d_M}\right)^{2/3} \cdot \exp(-\epsilon); \quad \text{wherein}$$

the Hencky strain rate $\dot{\epsilon}_H$ is defined as for the Hencky strain ε;

"F" is the tangential stretching force;

"R" is the radius of the equi-dimensional windup drums;

"T" is the measured torque signal, related to the tangential stretching force "F";

"A" is the instantaneous cross-sectional area of a stretched molten specimen;

"A0" is the cross-sectional area of the specimen in the solid state (i.e. prior to melting);

"ds" is the solid state density; and

"dM" the melt density of the polymer.

When measured on the biaxially oriented film, the strain hardening index (SHI@1 s$^{-1}$) is preferably at least 0.15, more preferred of at least 0.20, yet more preferred the strain hardening index (SHI@1 s$^{-1}$) is in the range of 0.15 to 0.30, like 0.15 to below 0.30, and still yet more preferred in the range of 0.15 to 0.29. In a further embodiment it is preferred that the strain hardening index (SHI@1 s$^{-1}$) of the biaxially oriented film is in the range of 0.20 to 0.30, like 0.20 to below 0.30, more preferred in the range of 0.20 to 0.29.

Another physical parameter which is sensitive to crystallinity and macro-structural effects is the so-called multi-branching index (MBI), as will be explained below in further detail.

Similarly to the measurement of SHI@1 s$^{-1}$, a strain hardening index (SHI) can be determined at different strain rates. A strain hardening index (SHI) is defined as the slope of the logarithm to the basis 10 of the tensile stress growth function $\eta_E^+$, lg($\eta_E^+$), as function of the logarithm to the basis 10 of the Hencky strain ε, lg(ε), between Hencky strains 1.00 and 3.00 at a temperature of 180° C., wherein a SHI@0.1 s−1 is determined with a deformation rate $\dot{\epsilon}_H$ of 0.10 s$^{-1}$, a SHI@0.3 s−1 is determined with a deformation rate $\dot{\epsilon}_H$ of 0.30 s$^{-1}$, a SHI@3.0 s−1 is determined with a deformation rate $\dot{\epsilon}_H$ of 3.00 s$^{-1}$, a SHI@10.0 s-1 is determined with a deformation rate H of 10.0 s$^{-1}$. In comparing the strain hardening index (SHI) at those five strain rates $\dot{\epsilon}_H$ of 0.10, 0.30, 1.00, 3.00 and 10.00 s$^{-1}$, the slope of the strain hardening index (SHI) as function of the logarithm on the basis 10 of $\dot{\epsilon}_H$, lg($\dot{\epsilon}_H$), is a characteristic measure for short-chain-branching. Therefore, a multi-branching index (MBI) is defined as the slope of the strain hardening index (SHI) as a function of lg($\dot{\epsilon}_H$), i.e. the slope of a linear fitting curve of the strain hardening index (SHI) versus $\lg(\dot{\epsilon}_H)$ applying the least square method, preferably the strain hardening index (SHI) is defined at deformation rates $\dot{\epsilon}_H$ between 0.05 s$^{-1}$ and 20.00 s$^{-1}$, more preferably between 0.10 s$^{-1}$ and 10.00 s$^{-1}$, still more preferably at the deformations rates 0.10, 0.30, 1.00, 3.00 and 10.00 s$^{-1}$. Yet more preferably the SHI-values determined by the deformations rates 0.10, 0.30, 1.00, 3.00 and 10.00 s$^{-1}$ are used for the linear fit according to the least square method when establishing the multi-branching index (MBI).

Preferably, the polypropylene component of the film has a multi-branching index (MBI) of at least 0.10, more preferably at least 0.15, yet more preferably the multi-branching index (MBI) is in the range of 0.10 to 0.30. In a preferred embodiment the polypropylene has a multi-branching index (MBI) in the range of 0.15 to 0.30.

The polypropylene component of the film of the present technology is characterized by the fact that the strain hardening index (SHI) increases to some extent with the deformation rate $\dot{\epsilon}_H$ (i.e. short-chain branched polypropylenes), i.e. a phenomenon which is not observed in linear polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear polymers do not show such a relationship, i.e. the strain hardening index (SHI) is not influenced by the deformation rate (see FIG. 2). Accordingly, the strain hardening index (SHI) of known polymers, in particular known polypropylenes, does not increase with increase of the deformation rate (dε/dt). Industrial conversion processes which imply elongational flow operate at very fast extension rates. Hence the advantage of a material which shows more pronounced strain hardening (measured by the strain hardening index SHI) at high strain rates becomes obvious. The faster the material is stretched, the higher the strain hardening index and hence the more stable the material will be in conversion.

When measured on the biaxially oriented film, the multi-branching index (MBI) is at least 0.10, more preferably of at least 0.15, yet more preferably the multi-branching index (MBI) is in the range of 0.10 to 0.30. In a preferred embodiment the film has a multi-branching index (MBI) in the range of 0.15 to 0.30.

Additionally the polypropylene of the biaxially oriented film of the present technology has preferably a branching index g' of less than 1.00. Still more preferably the branching index g' is more than 0.7. Thus it is preferred that the branching index g' of the polypropylene is in the range of more than 0.7 to below 1.0, more preferred in the range of more than 0.7 to 0.95, still more preferred in the range of 0.75 to 0.95. The branching index g' defines the degree of branching and correlates with the amount of branches of a polymer. The branching index g' is defined as g'=[IV]$_{br}$/[IV]$_{lin}$ in which g' is the branching index, [IV$_{br}$] is the intrinsic viscosity of the branched polypropylene and [IV]$_{lin}$ is the intrinsic viscosity of the linear polypropylene having the same weight average molecular weight (within a range of ±3%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference.

The intrinsic viscosity needed for determining the branching index g' is measured according to DIN ISO 1628/1, October 1999 (in decalin at 135° C.).

When measured on the biaxially oriented polypropylene film, the branching index g' is preferably in the range of more than 0.7 to below 1.0.

For further information concerning the measuring methods applied to obtain the relevant data for the branching index g', the tensile stress growth function $\eta_E^+$, the Hencky strain rate $\dot{\epsilon}_H$, the Hencky strain $\epsilon$ and the multi-branching index (MBI) it is referred to the example section.

The molecular weight distribution (MWD) (also determined herein as polydispersity) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

It is preferred that the film of the present technology comprises a polypropylene which has a weight average molecular weight ($M_w$) from 10,000 to 2,000,000 g/mol, more preferably from 20,000 to 1,500,000 g/mol.

The number average molecular weight ($M_n$) of the polypropylene is preferably in the range of 5,000 to 1,000,000 g/mol, more preferably from 10,000 to 750,000 g/mol.

As a broad molecular weight distribution improves the processability of the polypropylene the molecular weight distribution (MWD) is preferably up to 20.00, more preferably up to 10.00, still more preferably up to 8.00. In an alternative embodiment the molecular weight distribution (MWD) is preferably between 1.00 to 8.00, still more preferably in the range of 1.00 to 6.00, yet more preferably in the range of 1.00 to 4.00.

Furthermore, it is preferred that the polypropylene component of the film of the present technology has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$. Accordingly, it is preferred that in the present technology the biaxially oriented film comprises a polypropylene which has an MFR$_2$ up to 10.00 g/10 min, more preferably up to 6.00 g/10 min. In another preferred embodiment the polypropylene has MFR$_2$ up to 4 g/10 min. A preferred range for the MFR$_2$ is 1.00 to 10.00 g/10 min, more preferably in the range of 1.00 to 8.00 g/10 min.

As cross-linking has a detrimental effect on the extensional flow properties it is preferred that the polypropylene according to the present technology is non-cross-linked.

More preferably, the polypropylene of the instant technology is isotactic. Thus the polypropylene of the film according to the present technology shall have a rather high isotacticity measured by meso pentad concentration (also referred herein as pentad concentration), i.e. higher than 91%, more preferably higher than 93%, still more preferably higher than 94% and most preferably higher than 95%. On the other hand pentad concentration shall be not higher than 99.5%. The pentad concentration is an indicator for the narrowness in the regularity distribution of the polypropylene and measured by NMR-spectroscopy.

In addition, it is preferred that the polypropylene of the biaxially oriented film has a melting temperature Tm of higher than 148° C., more preferred higher than 150° C. In a preferred embodiment, Tm of the polypropylene component is higher than 148° C. but below 156° C. The measuring method for the melting temperature Tm is discussed in the example section.

The melting temperature Tm of the biaxially oriented polypropylene film is preferably at least 148° C., more preferably at least 150° C. In a preferred embodiment, Tm of the biaxially oriented polypropylene film is higher than 150° C. but below 160° C.

Preferably, the polypropylene component of the film of the present technology has a tensile modulus of at least 800 MPa, measured according to ISO 527-3 at a cross head speed of 1 mm/min. More preferably, the polypropylene component has a tensile modulus of at least 850 MPa, even more preferably 900 MPa, and most preferably at least 950 MPa.

Preferably, the biaxially oriented polypropylene film of the present technology has a tensile modulus of at least 1800 MPa at a draw ratio of 4 in machine direction and a draw ratio of 4 in transverse direction, wherein the tensile modulus is measured according to ISO 527-3 at a cross head speed of 1 mm/min. More preferably, the polypropylene film has a tensile modulus of at least 1900 MPa, even more preferably 1950 MPa, and most preferably at least 2000 MPa at a draw ratio of 4 in machine direction and a draw ratio of 4 in transverse direction.

Such rather high tensile modulus at a draw ratio of 4 in machine direction and a draw ratio of 4 in transverse direction is appreciated since biaxially oriented polypropylene films commercially are stretched with a draw ratio of 4 to 6 in machine direction and with a draw ratio of 5 to 8 in transverse direction.

In a preferred embodiment, the film has a stretching stress of at least 2.5 MPa in machine direction and at least 2.5 MPa in transverse direction at a stretching temperature of 157° C. or less, more preferably 152° C. or less, and a draw ratio of 4 in machine direction and in transverse direction. Preferably, the stretching temperature mentioned above is at least 2° C., more preferably at least 3° C. below the melting temperature of the film.

Preferably the polymer of the film according to the present technology has low levels of impurities, i.e. low levels of aluminium (Al) residue and/or low levels of silicon residue (Si) and/or low levels of boron (B) residue. Accordingly the aluminium residues of the polypropylene can be lowered to a level of 12.00 ppm. On the other hand the properties of the present technology are not detrimentally influenced by the presence of residues. Hence in one preferred embodiment the film according to the present technology comprises a polypropylene which is preferably essentially free of any boron and/or silicon residues, i.e. residues thereof are not detectable (The analysis of residue contents is defined in the example section). In another preferred embodiment the polypropylene of the film according to the present technology comprises boron and/or silicon in detectable amounts, i.e. in amounts of more than 0.10 ppm of boron residues and/or silicon residues, still more preferably in amounts of more than 0.20 ppm of boron residues and/or silicon residues, yet more preferably in amounts of more than 0.50 ppm of boron residues and/or silicon residues. In still another preferred embodiment the polypropylene component of the film according to the present technology comprises Al residues in an amount of more than 12.00 ppm. In yet another preferred embodiment the polypropylene component of the film according to the present technology comprises boron and/or silicon in detectable amounts, i.e. in amounts of more than 0.20 ppm of boron residues and/or silicon residues, and aluminium residues in amounts of more than 12.00 ppm, more preferably of more than 25 ppm.

Preferably the film according to the present technology has low levels of impurities, i.e. low levels of aluminium (Al) residue and/or low levels of silicon residue (Si) and/or low levels of boron (B) residue. Accordingly the aluminium residues of the film can be lowered to a level of 12.00 ppm. On the other hand the properties of the present technology are not detrimentally influenced by the presence of residues. Hence in one preferred embodiment the film according to the present technology is preferably essentially free of any boron and/or silicon residues, i.e. residues thereof are not detectable (The analysis of residue contents is defined in the example section). In another preferred embodiment the film according to the present technology comprises boron and/or silicon in detectable amounts, i.e. in amounts of more than 0.10 ppm of boron residues and/or silicon residues, still more preferably in amounts of more than 0.20 ppm of boron residues and/or silicon residues, yet more preferably in amounts of more than 0.50 ppm of boron residues and/or silicon residues. In still another preferred embodiment the film according to the present technology comprises Al residues in an amount of more than 12.00 ppm. In yet another preferred embodiment the film according to the present technology comprises boron and/or silicon in detectable amounts, i.e. in amounts of more than 0.20 ppm of boron residues and/or silicon residues, and aluminium residues in amounts of more than 12.00 ppm, more preferably of more than 25 ppm.

In a preferred embodiment the polypropylene as defined above (and further defined below) is preferably unimodal. In another preferred embodiment the polypropylene as defined above (and further defined below) is preferably multimodal, more preferably bimodal.

"Multimodal" or "multimodal distribution" describes a frequency distribution that has several relative maxima (contrary to unimodal having only one maximum). In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the polypropylene of the biaxially oriented film is not unimodal it is preferably bimodal.

The polypropylene of the film according to the present technology can be a homopolymer or a copolymer. In case the polypropylene is unimodal the polypropylene is preferably a polypropylene homopolymer. In turn in case the polypropylene is multimodal, more preferably bimodal, the polypropylene can be a polypropylene homopolymer as well as a polypropylene copolymer. However it is in particular preferred that in case the polypropylene is multimodal, more preferably bimodal, the polypropylene is a polypropylene homopolymer. Furthermore it is preferred that at least one of the fractions of the multimodal polypropylene is a short-chain branched polypropylene, preferably a short-chain branched polypropylene homopolymer, as defined above.

The polypropylene of the film according to the present technology is most preferably a unimodal polypropylene homopolymer.

The expression polypropylene homopolymer as used in the present technology relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be determined with FT infrared spectroscopy, as described below in the examples.

In case the polypropylene of the film according to the present technology is a multimodal or bimodal polypropylene copolymer, it is preferred that the comonomer is ethylene. However, also other comonomers known in the art are suitable. Preferably, the total amount of comonomer, more preferably ethylene, in the propylene copolymer is up to 30 wt %, more preferably up to 25 wt %.

In a preferred embodiment, the multimodal or bimodal polypropylene copolymer is a polypropylene copolymer comprising a polypropylene homopolymer matrix being a short chain branched polypropylene as defined above and an ethylene-propylene rubber (EPR).

The polypropylene homopolymer matrix can be unimodal or multimodal, i.e. bimodal. However it is preferred that polypropylene homopolymer matrix is unimodal.

Preferably, the ethylene-propylene rubber (EPR) in the total multimodal or bimodal polypropylene copolymer is up to 80 wt %. More preferably the amount of ethylene-propylene rubber (EPR) in the total multimodal or bimodal polypropylene copolymer is in the range of 20 to 80 wt %, still more preferably in the range of 30 to 60 wt %.

In addition, it is preferred that the multimodal or bimodal polypropylene copolymer comprises a polypropylene homopolymer matrix being a short chain branched polypropylene as defined above and an ethylene-propylene rubber (EPR) with an ethylene-content of up to 50 wt %.

In addition, it is preferred that the polypropylene as defined above is produced in the presence of the catalyst as defined below. Furthermore, for the production of the polypropylene as defined above, the process as stated below is preferably used.

The polypropylene of the biaxially oriented film according to the present technology has been in particular obtained by a new catalyst system. This new catalyst system comprises a symmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

A symmetric catalyst according to the present technology is a metallocene compound having a $C_2$-symmetry. Preferably the $C_2$-symmetric metallocene comprises two identical organic ligands, still more preferably comprises only two organic ligands which are identical, yet more preferably comprises only two organic ligands which are identical and linked via a bridge.

Said symmetric catalyst is preferably a single site catalyst (SSC).

Due to the use of the catalyst system with a very low porosity comprising a symmetric catalyst the manufacture of the above defined short-chain branched polypropylene is possible.

Furthermore it is preferred, that the catalyst system has a surface area of lower than 25 m²/g, yet more preferred lower than 20 m²/g, still more preferred lower than 15 m²/g, yet still lower than 10 m²/g and most preferred lower than 5 m²/g. The surface area according to the present technology is measured according to ISO 9277 ($N_2$).

It is in particular preferred that the catalytic system according to the present technology comprises a symmetric catalyst, i.e. a catalyst as defined above and in further detail below, and has porosity not detectable when applying the method according to DIN 66135 ($N_2$) and has a surface area measured according to ISO 9277 ($N_2$) less than 5 m²/g.

Preferably the symmetric catalyst compound, i.e. the $C_2$-symmetric metallocene, has the formula (I):

$$(Cp)_2R_1MX_2 \qquad (I);$$

wherein:

M is Zr, Hf or Ti, more preferably Zr; and

X is independently a monovalent anionic ligand, such as σ-ligand;

R is a bridging group linking the two Cp ligands;

Cp is an organic ligand selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl;

with the proviso that both Cp-ligands are selected from the above stated group and both Cp-ligands are chemically the same, i.e. are identical.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the symmetric catalyst is of formula (I) indicated above, wherein:

M is Zr; and each X is Cl.

Preferably both identical Cp-ligands are substituted.

The optional one or more substituent(s) bonded to cyclopenadienyl, indenyl, tetrahydroindenyl, or fluorenyl may be selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both identical Cp-ligands are indenyl moieties wherein each indenyl moiety bear one or two substituents as defined above. More preferably each of the identical Cp-ligands is an indenyl moiety bearing two substituents as defined above, with the proviso that the substituents are chosen in such are manner that both Cp-ligands are of the same chemical structure, i.e both Cp-ligands have the same substituents bonded to chemically the same indenyl moiety.

Still more preferably both identical Cp's are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp are of the same chemical structure, i.e both Cp-ligands have the same substituents bonded to chemically the same indenyl moiety.

Still more preferred both identical Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with proviso that the indenyl moieties of both Cp are of the same chemical structure, i.e both Cp-ligands have the same substituents bonded to chemically the same indenyl moiety.

Yet more preferably both identical Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp's are of the same chemical structure, i.e both Cp-ligands have the same substituents bonded to chemically the same indenyl moiety.

Concerning the moiety "R" it is preferred that "R" has the formula (II)

—Y(R')$_2$— (II);

wherein:
Y is C, Si or Ge; and
R' is $C_1$ to $C_{20}$ alkyl, $C_6$-$C_{12}$ aryl, or $C_7$-$C_{12}$ arylalkyl or trimethylsilyl.

In case both Cp-ligands of the symmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. trimethylsilyl, $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the symmetric catalyst, i.e. the $C_2$-symmetric metallocene, is defined by the formula (III):

(Cp)$_2$R$_1$ZrCl$_2$ (III);

wherein:

both Cp coordinate to M and are selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl;

with the proviso that both Cp-ligands are chemically the same, i.e. are identical, and R is a bridging group linking two ligands L;
wherein R is defined by the formula (II):

—Y(R')$_2$— (II);

wherein:
Y is C, Si or Ge and
R' is $C_1$ to $C_{20}$ alkyl, $C_6$-$C_{12}$ aryl, trimethylsilyl or $C_7$-$C_{12}$ arylalkyl.

More preferably the symmetric catalyst is defined by the formula (III), wherein both Cp are selected from the group consisting of substituted cyclopenadienyl, substituted indenyl, substituted tetrahydroindenyl, and substituted fluorenyl.

In a preferred embodiment the symmetric catalyst is dimethylsilyl(2-methyl-4-phenyl-indenyl)$_2$zirkonium dichloride (dimethylsilandiylbis(2-methyl-4-phenyl-indenyl)zirkonium dichloride). More preferred said symmetric catalyst is non-silica supported.

The above described symmetric catalyst components are prepared according to the methods described in WO 01/48034.

It is in particular preferred that the symmetric catalyst is obtainable by the emulsion solidification technology as described in WO 03/051934. This document is herewith included in its entirety by reference. Hence the symmetric catalyst is preferably in the form of solid catalyst particles, obtainable by a process comprising the steps of:

a. preparing a solution of one or more symmetric catalyst components;
b. dispersing said solution in a solvent immiscible therewith to form an emulsion in which said one or more catalyst components are present in the droplets of the dispersed phase;
c. solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2/g$, still more preferably less than 20 $m^2/g$, yet more preferably less than 15 $m^2/g$, yet still more preferably less than 10 $m^2/g$ and most preferably less than 5 $m^2/g$, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

The above described symmetric catalyst components are prepared according to the methods described in WO 01/48034.

As mentioned above the catalyst system may further comprise an activator as a cocatalyst, as described in WO 03/051934, which is enclosed herein with reference.

Preferred as cocatalysts for metallocenes and non-metallocenes, if desired, are the aluminoxanes, in particular the $C_1$-$C_{10}$-allylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the present technology is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present technology is related to the use of the above-defined catalyst system for the production of a polypropylene according to the present technology.

In addition, the present technology is related to the process for producing the inventive polypropylene, whereby the catalyst system as defined above is employed. Furthermore it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to the present technology is produced preferably in a multi-stage process in a multi-stage reaction sequence as described in WO 92/12182. The contents of this document are included herein by reference.

It has previously been known to produce multimodal, in particular bimodal, polypropylene in two or more reactors connected in series, i.e. in different steps (a) and (b).

According to the present technology, the main polymerization stages are preferably carried out as a combination of a bulk polymerization/gas phase polymerization.

The bulk polymerizations are preferably performed in a so-called loop reactor.

In order to produce the multimodal polypropylene according to the present technology, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a).

If desired, a further elastomeric comonomer component, so called ethylene-propylene rubber (EPR) component as in the present technology, may be incorporated into the obtained polypropylene homopolymer matrix to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:

the temperature is within the range of 40° C. to 110° C., preferably between 60° C. and 100° C., 70 to 90° C.;

the pressure is within the range of 20 bar to 80 bar, preferably between 30 bar to 60 bar;
hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:
the temperature is within the range of 50° C. to 130° C., preferably between 60° C. and 100° C.;
the pressure is within the range of 5 bar to 50 bar, preferably between 15 bar to 35 bar;
hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The process of the present technology or any embodiments thereof above enable highly feasible means for producing and further tailoring the propylene polymer composition within the present technology, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made polypropylene as defined above.

According to a second embodiment of the present technology, the object outlined above is solved by providing a biaxially oriented polypropylene film wherein the film has
a. xylene solubles of less than 1.35 wt %; and
b. a tensile modulus of at least 1800 MPa at a draw ratio of 4 in machine direction and a draw ratio of 4 in transverse direction, wherein the tensile modulus is measured according to ISO 527-3 at a cross head speed of 1 mm/min.

The specific amount of xylene solubles in combination with the tensile modulus as specified above enables to improve the balance of processing properties and stiffness of the final film.

In a preferred embodiment, the film has xylene solubles in the range of 0.5 wt % to less than 1.35 wt, more preferably 0.60 wt % to less than 1.35 wt %, and most preferably 0.60 wt % to 1.00 wt %.

Preferably, the biaxially oriented polypropylene film of the present technology has a tensile modulus of at least 2000 MPa at a draw ratio of 4 in machine direction and a draw ratio of 4 in transverse direction. More preferably, the polypropylene film has a tensile modulus of at least 2300 MPa, even more preferably 2500 MPa at a draw ratio of 4 in machine direction and a draw ratio of 4 in transverse direction.

In a preferred embodiment, the film of the present technology has a stretching stress of at least 2.5 MPa in machine direction and at least 2.5 MPa in transverse direction at a stretching temperature of 152° C. or less and a draw ratio of 4 in machine direction and in transverse direction. Preferably, the stretching temperature mentioned above is at least 2° C., more preferably at least 3° C. below the melting temperature of the film.

With regard to the properties of the polypropylene component of the second embodiment, reference is made to the statements provided above when discussing the first embodiment of the present technology.

The biaxially oriented polypropylene film can be prepared by conventional drawing processes known in the art. Typically, a cast film is prepared first by extrusion of polypropylene pellets. Prepared cast films may typically have a thickness of 50-100 μm as used for further film stretching. Subsequently, a staple of cast films can be prepared from a number of cast film sheets to achieve a specific staple thickness, e.g. 700-1000 μm. The stretching temperature is typically set to a temperature slightly below the melting point, e.g. 2-4° C. below the melting point, and the film is stretched at a specific draw ratio in machine direction and transverse direction.

The present technology will now be described in further detail by the following examples.

EXAMPLES

1. Definitions/Measuring Methods

The following definitions of terms and determination methods apply for the above general description of the present technology as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Multi-Branching Index

1. Acquiring the Experimental Data

Polymer is melted at T=180° C. and stretched with the SER Universal Testing Platform as described below at deformation rates of $d\epsilon/dt$=0.1 0.3 1.0 3.0 and 10 s$^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device less than a threshold of $5\times10^{-3}$ mNm (Milli-Newtonmeter) which is required for precise and correct measurements, following check procedure is performed prior to each measurement:
The device is set to test temperature (180° C.) for minimum 20 minutes without sample in presence of the clamps;

A standard test with 0.3 s$^{-1}$ is performed with the device on test temperature (180° C.)

The torque (measured in mNm) is recorded and plotted against time;

The torque must not exceed a value of 5×10$^{-3}$ mNm to make sure that the friction of the device is in an acceptably low range.

Conducting the Experiment

The device is heated for 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes+/−20 seconds before the experiment is started.

During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must me wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates dε/dt applied, the resulting tensile stress growth function $\eta_E^+$ (dε/dt, t) is plotted against the total Hencky strain ε to determine the strain hardening behaviour of the melt, see FIG. 1.

In the range of Hencky strains between 1.0 and 3.0, the tensile stress growth function $\eta_E^+$ can be well fitted with a function:

$$\eta_E(\dot{\varepsilon}, \varepsilon) = c_1 \varepsilon^{c_2}$$

where $c_1$ and $c_2$ are fitting variables. Such derived $c_2$ is a measure for the strain hardening behavior of the melt and called Strain Hardening Index SHI.

Dependent on the polymer architecture, SHI can:
be independent of the strain rate (linear materials, Y- or H-structures)
increase with strain rate (short chain-, hyper- or multi-branched structures).

Figure 2:
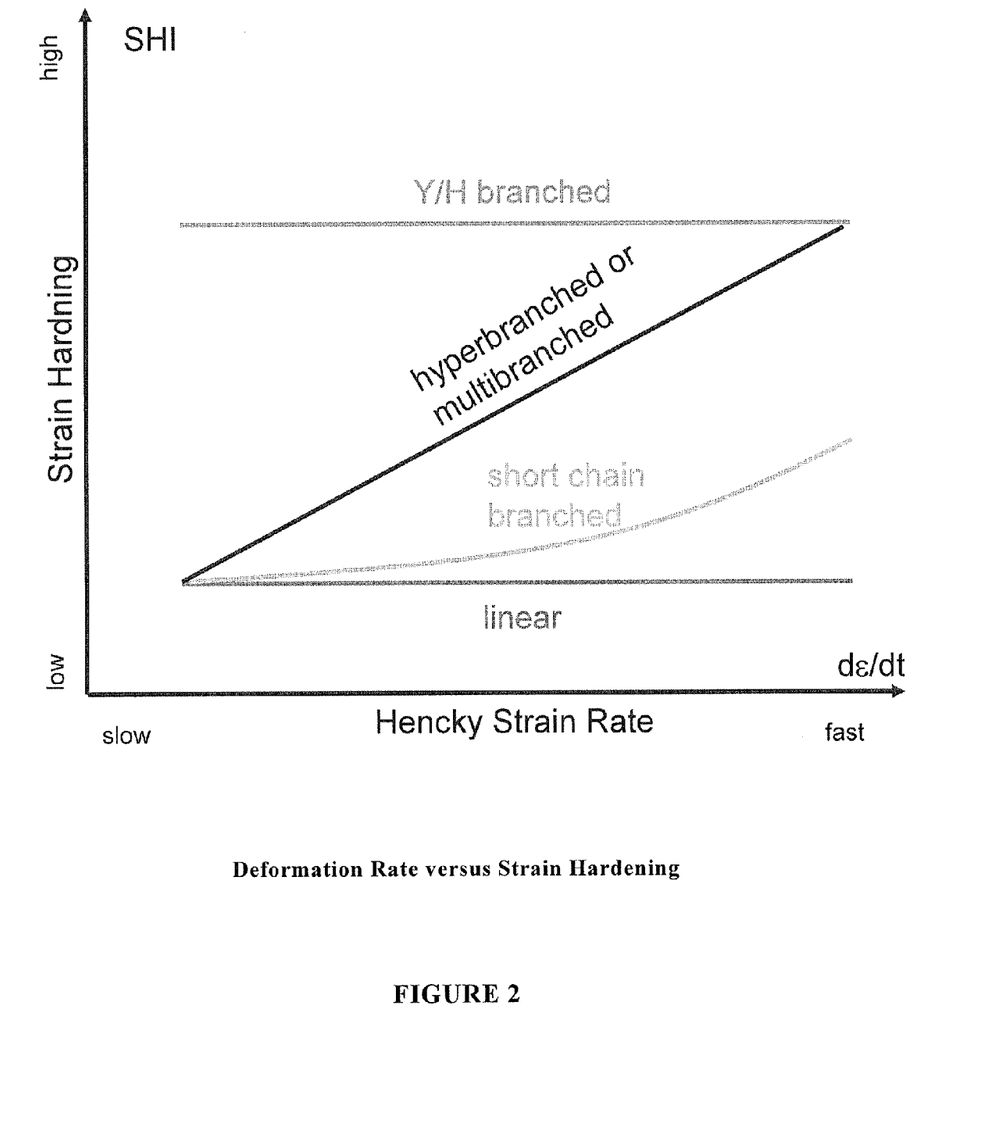
FIG. 2 is a graph depicting the deformation rate versus strain hardening.

This is illustrated in FIG. 2.

For polyethylene, linear (HDPE), short-chain branched (LLDPE) and hyperbranched structures (LDPE) are well known and hence they are used to illustrate the structural analytics based on the results on extensional viscosity. They are compared with a polypropylene with Y and H-structures with regard to their change of the strain-hardening behavior as function of strain rate, see FIG. 2 and Table 1.

To illustrate the determination of SHI at different strain rates as well as the multi-branching index (MBI) four polymers of known chain architecture are examined with the analytical procedure described above.

The first polymer is a H- and Y-shaped polypropylene homopolymer made according to EP 879 830 ("A"). It has a MFR230/2.16 of 2.0 g/10 min, a tensile modulus of 1950 MPa and a branching index g' of 0.7.

The second polymer is a commercial hyperbranched LDPE, Borealis "B", made in a high pressure process known in the art. It has a MFR190/2.16 of 4.5 and a density of 923 kg/m$^3$.

The third polymer is a short chain branched LLDPE, Borealis "C", made in a low pressure process known in the art. It has a MFR190/2.16 of 1.2 and a density of 919 kg/m$^3$.

The fourth polymer is a linear HDPE, Borealis "D", made in a low pressure process known in the art. It has a MFR190/2.16 of 4.0 and a density of 954 kg/m$^3$.

The four materials of known chain architecture are investigated by means of measurement of the transient elongational viscosity at 180° C. at strain rates of 0.10, 0.30, 1.0, 3.0 and 10 s$^{-1}$. Obtained data (transient elongational viscosity versus Hencky strain) is fitted with a function:

$$\eta_E^+ = c_l * \varepsilon^{c_2}$$

for each of the mentioned strain rates. The parameters c1 and c2 are found through plotting the logarithm of the transient elongational viscosity against the logarithm of the Hencky strain and performing a linear fit of this data applying the least square method. The parameter c1 calculates from the intercept of the linear fit of the data lg($\eta_E^+$) versus lg(ε) from:

$$c_1 = 10^{Intercept}$$

and $c_2$ is the strain hardening index (SHI) at the particular strain rate.

This procedure is done for all five strain rates and hence, SHI@0.1 s$^{-1}$, SHI@0.3 s$^{-1}$, SHI@1.0 s$^{-1}$, SHI@3.0 s$^{-1}$, SHI@10 s$^{-1}$ are determined, see FIG. 1.

TABLE 1

| | | | SHI-values | | | |
|---|---|---|---|---|---|---|
| dε/dt | lg (dε/dt) | Property | Y and H branched A | multi-branched B | short-chain branched C | linear D |
| 0.1 | −1.0 | SHI@0.1 s$^{-1}$ | 2.05 | — | 0.03 | 0.03 |
| 0.3 | −0.5 | SHI@0.3 s$^{-1}$ | — | 1.36 | 0.08 | 0.03 |
| 1 | 0.0 | SHI@1.0 s$^{-1}$ | 2.19 | 1.65 | 0.12 | 0.11 |
| 3 | 0.5 | SHI@3.0 s$^{-1}$ | — | 1.82 | 0.18 | 0.01 |
| 10 | 1.0 | SHI@10 s$^{-1}$ | 2.14 | 2.06 | — | — |

From the strain hardening behaviour measured by the values of the SHI@1 s$^{-1}$ one can already clearly distinguish between two groups of polymers: Linear and short-chain branched have a SHI@1 s$^{-1}$ significantly smaller than 0.30. In contrast, the Y and H-branched as well as hyperbranched materials have a SHI@1 s$^{-1}$ significantly larger than 0.30.

In comparing the strain hardening index at those five strain rates $\dot{\varepsilon}_H$ of 0.10, 0.30, 1.0, 3.0 and 10 s$^{-1}$, the slope of SHI as function of the logarithm of $\dot{\varepsilon}_H$, lg($\dot{\varepsilon}_H$) is a characteristic measure for multi-branching. Therefore, a multi-branching index (MBI) is calculated from the slope of a linear fitting curve of SHI versus lg($\dot{\varepsilon}_H$):

$$SHI(\dot{\varepsilon}_H) = c3 + MBI * lg(\dot{\varepsilon}_H)$$

The parameters c3 and MBI are found through plotting the SHI against the logarithm of the Hencky strain rate lg($\dot{\varepsilon}_H$) and performing a linear fit of this data applying the least square method. Please confer to FIG. 2.

TABLE 2

MBI-values

| Property | Y and H branched A | multibranched B | short-chain branched C | linear D |
|---|---|---|---|---|
| MBI | 0.04 | 0.45 | 0.10 | 0.01 |

The multi-branching index MBI allows now to distinguish between Y or H-branched polymers which show a MBI smaller than 0.05 and hyperbranched polymers which show a MBI larger than 0.15. Further, it allows to distinguish between short-chain branched polymers with MBI larger than 0.10 and linear materials which have a MBI smaller than 0.10.

Similar results can be observed when comparing different polypropylenes, i.e. polypropylenes with rather high branched structures have higher SHI and MBI-values, respectively, compared to their linear and short-chain counterparts. Similar to the linear low density polyethylenes the new developed polypropylenes show a certain degree of short-chain branching. However the polypropylenes according to the instant technology are clearly distinguished in the SHI and MBI-values when compared to known linear low density polyethylenes. Without being bound on this theory, it is believed, that the different SHI and MBI-values are the result of a different branching architecture. For this reason the new found branched polypropylenes according to the present technology are designated as short-chain branched.

Combining both, strain hardening index and multi-branching index, the chain architecture can be assessed as indicated in Table 3:

TABLE 3

Strain Hardening Index (SHI) and Multi-branching Index (MBI) for various chain architectures

| Property | Y and H branched | Multi-branched | short-chain branched | linear |
|---|---|---|---|---|
| SHI@1.0 s$^{-1}$ | >0.30 | >0.30 | ≤0.30 | ≤0.30 |
| MBI | ≤0.10 | >0.10 | >0.10 | ≤0.10 |

C. Elementary Analysis

The below described elementary analysis is used for determining the content of elementary residues which are mainly originating from the catalyst, especially the Al-, B-, and Si-residues in the polymer. Said Al-, B- and Si-residues can be in any form, e.g. in elementary or ionic form, which can be recovered and detected from polypropylene using the below described ICP-method. The method can also be used for determining the Ti-content of the polymer. It is understood that also other known methods can be used which would result in similar results.

ICP-Spectrometry (Inductively Coupled Plasma Emission)

ICP-instrument: The instrument for determination of Al-, B- and Si-content is ICP Optima 2000 DV, PSN 620785 (supplier Perkin Elmer Instruments, Belgium) with software of the instrument.

Detection limits are 0.10 ppm (Al), 0.10 ppm (B), 0.10 ppm (Si).

The polymer sample was first ashed in a known manner, then dissolved in an appropriate acidic solvent. The dilutions of the standards for the calibration curve are dissolved in the same solvent as the sample and the concentrations chosen so that the concentration of the sample would fall within the standard calibration curve.

ppm: means parts per million by weight

Ash content: Ash content is measured according to ISO 3451-1 (1997) standard.

Calculated Ash, Al- Si- and B-Content:

The ash and the above listed elements, Al and/or Si and/or B can also be calculated form a polypropylene based on the polymerization activity of the catalyst as exemplified in the examples. These values would give the upper limit of the presence of said residues originating form the catalyst.

Thus the estimate catalyst residue is based on catalyst composition and polymerization productivity, catalyst residues in the polymer can be estimated according to:

Total catalyst residues [ppm]=1/productivity [kg$_{pp}$/g$_{catalyst}$]×100;

Al residues [ppm]=w$_{Al,catalyst}$ [%]×total catalyst residues [ppm]/100;

Zr residues [ppm]=w$_{Zr,catalyst}$ [%]×total catalyst residues [ppm]/100;

(Similar calculations apply also for B, Cl and Si residues).

Chlorine residues content: The content of Cl-residues is measured from samples in the known manner using X-ray fluorescence (XRF) spectrometry. The instrument was X-ray fluorescention Philips PW2400, PSN 620487, (Supplier: Philips, Belgium) software X47. Detection limit for Cl is 1 ppm.

D. Further Measuring Methods

Particle size distribution: Particle size distribution is measured via Coulter Counter LS 200 at room temperature with n-heptane as medium.

NMR

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

The xylene solubles (XS, wt.-%): Analysis according to the known method: 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered and evaporated in nitrogen flow and the residue dried under vacuum at 90° C. until constant weight is reached.

$XS\% = (100 \times m_1 \times v_0)/(m_0 \times v_1)$, wherein;

$m_0$=initial polymer amount (g);
$m_1$=weight of residue (g);
$v_0$=initial volume (ml);
$V_1$=volume of analyzed sample (ml).

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Stepwise Isothermal Segregation Technique (SIST): The isothermal crystallisation for SIST analysis was performed in a Mettler TA820 DSC on 3±0.5 mg samples at decreasing temperatures between 200° C. and 105° C.
(i) The samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down to ambient temperature, and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals as indicated in the table 7.

The melting curve of the material crystallised this way can be used for calculating the lamella thickness distribution according to Thomson-Gibbs equation (Eq 1.).

$$T_m = T_0\left(1 - \frac{2\sigma}{\Delta H_0 \cdot L}\right); \quad (1)$$

where $T_0$=457K, $\Delta H_0$=184×10$^6$ J/m$^3$, $\sigma$=0.0496 J/m$^2$ and L is the lamella thickness.

MFR$_2$: measured according to ISO 1133 (230° C., 2.16 kg load).

Comonomer content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —CH$_2$-absorption peak (800-650 cm$^{-1}$) was measured with Perkin Elmer FTIR 1600 spectrometer. The method was calibrated by ethylene content data measured by $^{13}$C-NMR.

Stiffness Film TD (transversal direction), Stiffness Film MD (machine direction), Elongation at break TD and Elongation at break MD: these are determined according to ISO527-3 (cross head speed: 1 mm/min).

Haze and transparency: are determined according to ASTM D1003-92 (haze).

Intrinsic viscosity: is measured according to DIN ISO 1628/1, October 1999 (in Decalin at 135° C.).

Porosity: is measured according to DIN 66135

Surface area: is measured according to ISO 9277

3. Examples

Inventive Example 1 (I 1)

Catalyst Preparation

The catalyst was prepared as described in example 5 of WO 03/051934, with the Al- and Zr-ratios as given in said example (Al/Zr=250).

Figure 3:
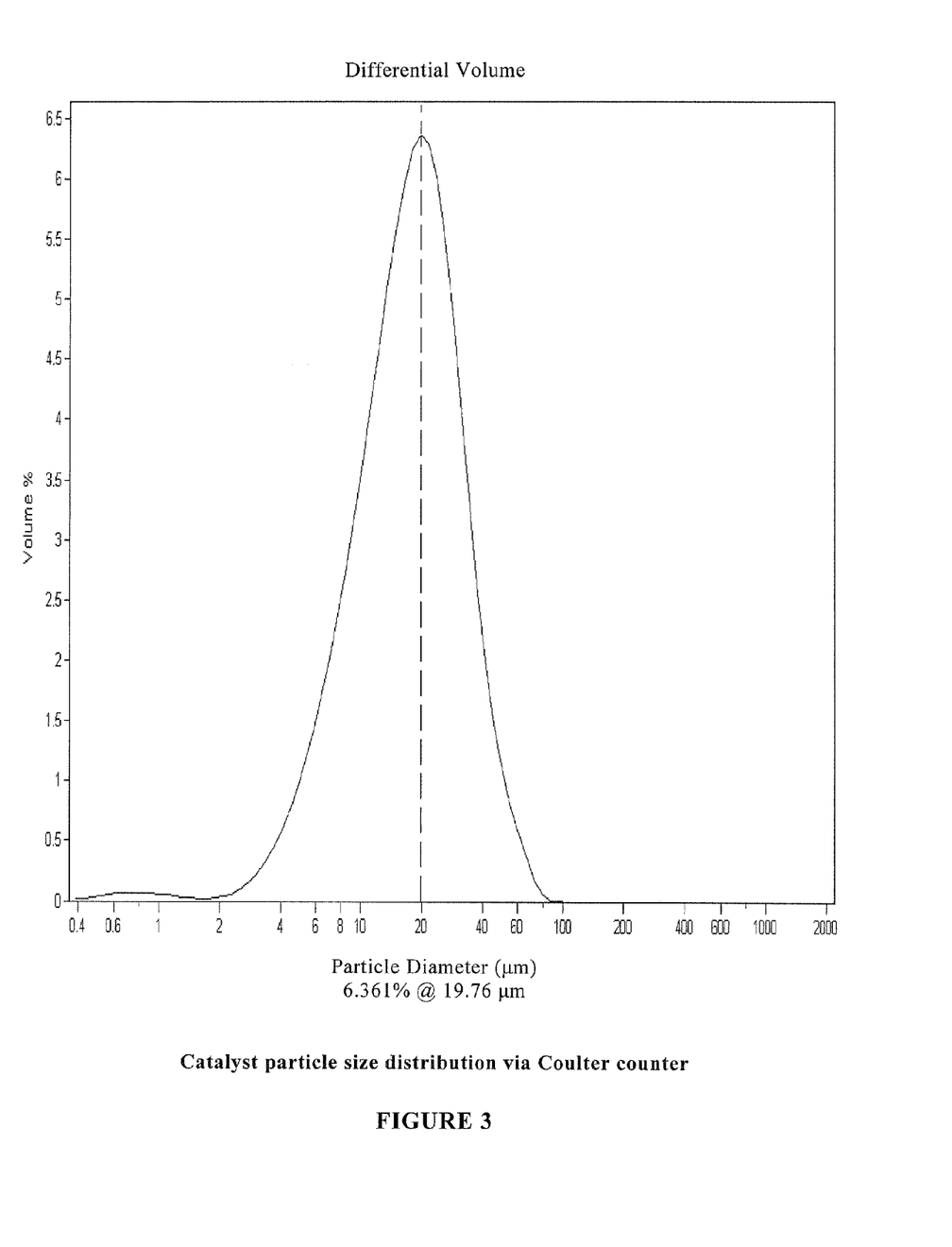
FIG. 3 is a graph depicting catalyst particle size distribution via Coulter counter.

Catalyst Characteristics:

Al- and Zr-content were analyzed via above mentioned method to 36.27 wt.-% Al and 0.42%-wt. Zr. The average particle diameter (analyzed via Coulter counter) is 20 μm and particle size distribution is shown in FIG. 3.

Polymerization

A 5 liter stainless steel reactor was used for propylene polymerizations. 1100 g of liquid propylene (Borealis polymerization grade) was fed to reactor. 0.2 ml triethylaluminum (100%, purchased from Crompton) was fed as a scavenger and 15 mmol hydrogen (quality 6.0, supplied by Aga) as chain transfer agent. Reactor temperature was set to 30° C. 29.1 mg catalyst were flushed into to the reactor with nitrogen overpressure. The reactor was heated up to 70° C. in a period of about 14 minutes. Polymerization was continued for 50 minutes at 70° C., then propylene was flushed out, 5 mmol hydrogen were fed and the reactor pressure was increased to 20 bars by feeding (gaseous-) propylene. Polymerization continued in gas-phase for 144 minutes, then the reactor was flashed, the polymer was dried and weighted.

Polymer yield was weighted to 901 g, that equals a productivity of 31 kg$_{PP}$/g$_{catalyst}$. 1000 ppm of a commercial stabilizer Irganox B 215 (FF) (Ciba) have been added to the powder. The powder has been melt compounded with a Prism TSE16 lab kneader at 250 rpm at a temperature of 220-230° C.

Inventive Example 2 (I 2)

A catalyst as used in I1 has been used.

A 5 liter stainless steel reactor was used for propylene polymerizations. 1100 g of liquid propylene (Borealis polymerization grade) was fed to reactor. 0.5 ml triethylaluminum (100%, purchased from Crompton) was fed as a scavenger and 50 mmol hydrogen (quality 6.0, supplied by Åga) as chain transfer agent. Reactor temperature was set to 30° C. 19.9 mg catalyst were flushed into to the reactor with nitrogen overpressure. The reactor was heated up to 70° C. in a period of about 14 minutes. Polymerization was continued for 40 minutes at 70° C., then propylene was flushed out, the reactor pressure was increased to 20 bars by feeding (gaseous-) propylene. Polymerization continued in gas-phase for 273 minutes, then the reactor was flashed, the polymer was dried and weighted.

Polymer yield was weighted to 871 g, that equals a productivity of 44 kg$_{PP}$/g$_{catalyst}$. 1000 ppm of a commercial stabilizer Irganox B 215 (FF) (Ciba) have been added to the powder. The powder has been melt compounded with a Prism TSE16 lab kneader at 250 rpm at a temperature of 220-230° C.

Inventive Example 3 (I 3)

50 wt % I3a have been mixed with 50 wt % I3b before compounding and pelletizing to obtain a bimodal polypropylene from melt blending with a Prism TSE16 lab kneader at 250 rpm at a temperature of 220-230° C.

Polymerisation Procedure I 3a:

The same catalyst as in example I1 has been used.

A 20 liter stainless steel reactor was used for propylene polymerization. 1000 g of liquid propylene (Borealis polymerization grade) was fed to reactor. 0.4 ml triethylaluminum (100% (purchased from Crompton), added as 1 molar solution in hexane)) was fed as a scavenger and 60 mmol hydrogen (quality 6.0, supplied by Aga) as chain transfer agent using propylene as spilling agent (250 resp. 500 g). Reactor temperature was set to 13° C. 73.4 mg catalyst was flushed into to the reactor with 250 g liquid propylene. The catalyst was prepolymerized for 10 min. Then the reactor was heated up to 70° C. in a period of about 15 minutes adding additional 2470 g propylene. Polymerization was continued for 30 minutes at 70° C. After that propylene was flashed and the polymer dried and weighed.

Polymer yield was 1185 g, equaling a productivity of 16.14 kg PP/g catalyst. 1000 ppm of a commercial stabilizer Irganox B 215 (FF) (Ciba) have been added to the powder.
Polymerisation Procedure I 3b:

The same catalyst as in example I1 has been used.

A 20 liter stainless steel reactor was used for propylene polymerization. 1000 g of liquid propylene (Borealis polymerization grade) was fed to reactor. 0.4 ml triethylaluminum (100% (purchased from Crompton), added as 1 molar solution in hexane)) was fed as a scavenger and 60 mmol hydrogen (quality 6.0, supplied by Aga) as chain transfer agent using propylene as spilling agent (250 resp. 500 g). Reactor temperature was set to 14° C. 70.9 mg catalyst, contacted with 1.8 ml white mineral oil (PRIMOL 352 D/Esso) for 15 min, was flushed into to the reactor with 250 g liquid propylene. The catalyst was prepolymerized for 10 min. Then the reactor was heated up to 70° C. in a period of about 17 minutes adding additional 2470 g propylene and 413 mmol H2. Polymerization was continued for 30 minutes at 70° C. After that propylene was flashed and the polymer dried and weighed.

Polymer yield was 1334 g, equaling a productivity of 18.82 kg PP/g catalyst. 1000 ppm of a commercial stabilizer Irganox B 215 (FF) (Ciba) have been added to the powder.

Comparative Example 1 (C 1)

A silica supported metallocene catalyst (I) was prepared according to WO 01/48034 (example 27). The porosity of the support is 1.6 ml/g. An asymmetric metallocene dimethylsilyl [(2-methyl-(4'-tert.butyl)-4-phenyl-indenyl)(2-isopropyl-(4'-tert.butyl)-4-phenyl-indenyl)]zirkonium dichloride has been used.

A 20 liter stainless steel reactor was used for propylene homopolymerization. 4470 g of liquid propylene (Borealis polymerization grade) was fed to reactor, 0.4 ml triethylaluminum (100% (purchased from Crompton), added as 1 molar solution in hexane) was fed as a scavenger and 4 mmol hydrogen (quality 6.0, supplied by Aga) as chain transfer agent using propylene as spilling agent (250 g). Reactor temperature was set to 30° C. and the reactor pressurized with N2 to 25 bar. 214 mg catalyst was flushed into to the reactor via N2 (increasing pressure about 0.9 bar in the reactor). After that the reactor temperature control was set up to 70° C. Polymerization was continued for 30 minutes at 70° C. Then monomers were flashed and the polymer was dried and weighed.

Polymer yield was 656 g, equaling a productivity of 3 kg PP/g catalyst. 000 ppm of a commercial stabilizer Irganox B 215 (FF) (Ciba) have been added to the powder. The powder has been melt compounded with a Prism TSE16 lab kneader at 250 rpm at a temperature of 220-230° C.

Comparative Example 2 (C 2)

A commercial polypropylene homopolymer of Borealis has been used.

Comparative Example 3 (C 3)

A commercial Polypropylene homopolymer of Borealis has been used.

In Tables 4, 5 and 6, the properties of samples C1-C3 and I1-I3 are summarized. Furthermore, Table 4 provides an evaluation of processing properties, stiffness and heat resistance.

TABLE 4

Properties of polypropylene according to the present technology and comparative examples

| Sample | Type | SHI | XS (wt %) | Processing | Stiffness | Heat Res. |
|---|---|---|---|---|---|---|
| C1 | Homo-PP, unimodal, prepared with single site catalyst on silica support | n/a | X | – | n/a | + |
| C2 | Homo-PP, prepared with Ziegler-Natta catalyst | 0 | 3.26 | ~ | + | + |
| C3 | Homo-PP, prepared with Ziegler-Natta catalyst | n/a | 1.39 | ~ | + | + |
| I1 | Homo-PP, prepared with single site catalyst on non-silica support with low porosity | 0.15 | 0.85 | + | + | + |
| I2 | Homo-PP, prepared with single site catalyst on non-silica support with low porosity | n/a | 0.66 | + | n/a | + |
| I3 | Homo-PP, prepared with single site catalyst on non-silica support with low porosity | 0.27 | 0.61 | + | + | + |

TABLE 5

Properties of polypropylene according to the present technology and comparative examples.

| Sample | SHI@1.0 s$^{-1}$ | MBI | g' | Al [ppm] | B [ppm] |
|---|---|---|---|---|---|
| C1 | 0 | <0.1 | 1 | 79 | 0 |
| C2 | 0 | <0.1 | 1 | n/a | 0 |
| C3 | 0 | <0.1 | 1 | 1-2 | 0 |
| I1 | 0.15 | 0.20 | 0.9 | 11 | 0 |
| I2 | n/a | n/a | 0.8 | 14 | 0 |
| I3 | 0.27 | 0.27 | 0.9 | 24 | 0 |

TABLE 6

Material Data.

| | Tm$^1$ | Tc$^2$ | Hm$^3$ | Hc$^4$ | XS | Mw | Mn | MWD | IV |
|---|---|---|---|---|---|---|---|---|---|
| Unit | ° C. | ° C. | J/g | J/g | wt % | kg/mol | kg/mol | — | ml/g |
| C1 | 156.1 | 107.2 | 95.7 | 90.7 | X | 443 | 163 | 2.7 | 265 |
| C2 | 162.6 | 110.7 | 103.6 | 97.6 | 3.26 | 506 | 110 | 4.6 | 306 |
| C3 | 163.2 | 112.6 | 107.1 | 104 | 1.39 | 628 | 73 | 8.6 | 366 |

TABLE 6-continued

Material Data.

|    | $Tm^1$ | $Tc^2$ | $Hm^3$ | $Hc^4$ | XS | Mw | Mn | MWD | IV |
|----|--------|--------|--------|--------|------|-----|-----|-----|-----|
| I1 | 150.6 | 111.9 | 99.5 | 74.6 | 0.85 | 453 | 162 | 2.8 | 246 |
| I2 | 150.8 | 111.2 | 100.1 | 92.8 | 0.66 | 405 | 76 | 5.3 | 207 |
| I3 | 153.2 | 112.7 | 105.7 | 97.4 | 0.61 | 453 | 77 | 5.9 | 240 |

[1]Tm: Melting temperature
[2]Tc: Crystallization temperature
[3]Hm: Melting enthalpy
[4]Hc: Crystallization enthalpy In Table 7, the crystallization behaviour of samples C3, I1 and I2 is determined via stepwise isothermal segregation technique (SIST).

TABLE 7

Results from stepwise isothermal segregation technique (SIST).

| Peak ID | Range [° C.] | I 1 $H_m$ [J/g] | I 2 $H_m$ [J/g] | C 3 $H_m$ [J/g] |
|---------|--------------|-----------------|-----------------|-----------------|
| 1 | <110 | 6.0 | 4.3 | 0.6 |
| 2 | 110-120 | 3.8 | 3.1 | 1.0 |
| 3 | 120-130 | 4.8 | 5.9 | 2.0 |
| 4 | 130-140 | 11.4 | 13.3 | 3.9 |
| 5 | 140-150 | 27.5 | 38.2 | 10.6 |
| 6 | 150-160 | 29.2 | 42.3 | 25.4 |
| 7 | 160-170 | 16.9 | 10.9 | 50.7 |
| 8 | >170 | 0.1 | 0.0 | 37.5 |

$H_m$ = melting enthalpy

A biaxially oriented film is prepared as follows:

In the biaxial stretching Device Bruckner Karo IV, film samples are clamped and extended in both, longitudinal and transverse direction, at constant stretching speed. The length of the sample increases during stretching in longitudinal direction and the stretch ratio in longitudinal direction calculates from the ratio of current length over original sample length. Subsequently, the sample is stretched in transverse direction where the width of the sample is increasing. Hence, the stretch ratio calculates from the current width of the sample over the original width of the sample.

In Table 8, the stretching properties of samples I1-I3 and C1-C3 are summarized.

TABLE 8

Stretching Properties.

| | Stretch T | Stress MD4[1] | Stress TD4[2] | Stress MD5[3] | Stress TD5[4] |
|---|---|---|---|---|---|
| Unit | ° C. | MPa | MPa | MPa | MPa |
| C1 | 152 | break | break | break | break |
| C2 | 158 | 3.44 | 2.94 | 4.94 | 3.92 |
| C3 | 158 | 4.27 | 3.43 | 5.31 | 4.20 |
| I1 | 147 | 3.59 | 3.02 | n/a | n/a |
| I2 | 147 | 2.69 | 2.53 | 3.51 | 3.40 |
| I3 | 150 | 2.74 | 2.89 | 3.09 | 3.55 |

[1]Stress MD4: Stretching stress in machine direction at a draw ratio of 4
[2]Stress TD4: Stretching stress in transverse direction at a draw ratio of 4
[3]Stress MD5: Stretching stress in machine direction at a draw ratio of 5
[4]Stress TD5: Stretching stresse in transverse direction at a draw ratio of 5

In Table 9, the properties of the biaxially oriented polypropylene films prepared from samples I1-I3 and C1-C3 are summarized.

TABLE 9

Biaxially oriented PP film properties.

| | Tensile Modulus | Tensile Strength | Tensile Strain at Strength | Work at Strength | Tensile Stress at Break | Tensile Strain at Break | Work at Break |
|---|---|---|---|---|---|---|---|
| Unit | MPa | MPa | % | J | MPa | % | J |
| C1 | 2118 | 84 | 140 | 8.2 | 82 | 142 | 8.3 |
| C2 | 2953 | 188 | 49 | 3.7 | 187 | 51 | 3.9 |
| C3 | 3003 | 192 | 52 | 4.0 | 192 | 52 | 4.0 |
| I1 | 2550 | 146 | 79 | 3.9 | 142 | 80 | 3.9 |
| I2 | 2020 | 115 | 59 | 2.5 | 107 | 62 | 2.6 |
| I3 | 2523 | n/a | n/a | n/a | n/a | 82 | n/a |

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. A polypropylene film comprising a polypropylene material having:
   a) xylene solubles of at least 0.5 percent by weight and
   b) a strain hardening index in the range of 0.15 to 0.30 measured at a deformation rate of $1.00$ s$^{-1}$ at a temperature of 180° C. and a branching index g' of less than 1.00; wherein the polypropylene film is biaxially oriented and wherein polypropylene material is a propylene homopolymer and further wherein the polypropylene material is prepared in the presence of a non-silica supported catalyst.

2. The polypropylene film of claim 1, wherein the strain hardening index is defined as the slope of a logarithm to the basis 10 of a tensile stress growth function as a function of a logarithm to the basis 10 of a Hencky strain for the range of Hencky strains between 1 and 3.

3. The polypropylene film of claim 1, wherein the polypropylene material has xylene solubles in the range of 0.5 to 1.5 percent by weight.

4. The polypropylene film of claim 1, wherein the film has a multi-branching index of at least 0.10, wherein the multi-branching index is defined as a slope of the strain hardening index as function of a logarithm to the basis 10 of the Hencky strain rate, defined as log(dε/dt), wherein
   a) dε/dt is the deformation rate;
   b) ε is the Hencky strain; and
   c) the strain hardening index is measured at a temperature of 180° C., wherein the strain hardening index is defined as a slope of a logarithm to the basis 10 of a tensile stress growth function as function of the logarithm to the basis 10 of the Hencky strain, for the range of the Hencky strains between 1 and 3.

5. The polypropylene film of claim 1, wherein the polypropylene material is multimodal.

6. The polypropylene film of claim 1, wherein the polypropylene material is unimodal.

7. The polypropylene film of claim 1, wherein the polypropylene material has an mmmm pentad concentration of higher than 94% as determined by NMR-spectroscopy.

8. The polypropylene film of claim 1, wherein the polypropylene material has a meso pentad concentration of higher than 94% as determined by NMR-spectroscopy.

9. The polypropylene film of claim 1, wherein the polypropylene material has been produced in the presence of a symmetric metallocene complex.

10. The polypropylene film of claim 1, wherein at least one of the film and the polypropylene material has a melting point of at least 148° C.

11. The polypropylene film of claim 10, wherein at least one of the film and the polypropylene material has a melting point in the range of 148 to 158° C.

12. The polypropylene film of claim 1, wherein the film has a stretching stress of at least 2.5 MPa in machine direction and at least 2.5 MPa in transverse direction at a stretching temperature of 152° C. or less, and a draw ratio of 4 in machine direction and in transverse direction.

13. A polypropylene film comprising a polypropylene material having:
   a) xylene solubles of at least 0.5 percent by weight; and
   b) a strain hardening index of in the range of 0.15 to 0.30 measured at a deformation rate of 1.00 $s^{-1}$ at a temperature of 180° C.;
      wherein the polypropylene film is biaxially oriented, wherein the polypropylene material is a propylene homopolymer, and further wherein the polypropylene material is prepared in the presence of a non-silica supported catalyst.

* * * * *